F. E. CATON.
FRUIT SLICING MACHINE.
APPLICATION FILED FEB. 26, 1908.

931,843.

Patented Aug. 24, 1909.
2 SHEETS—SHEET 1.

WITNESSES.

INVENTOR.
Fred E. Caton
by Wm. F. Booth
his Attorney

F. E. CATON.
FRUIT SLICING MACHINE.
APPLICATION FILED FEB. 26, 1908.
931,843.
Patented Aug. 24, 1909.
2 SHEETS—SHEET 2.
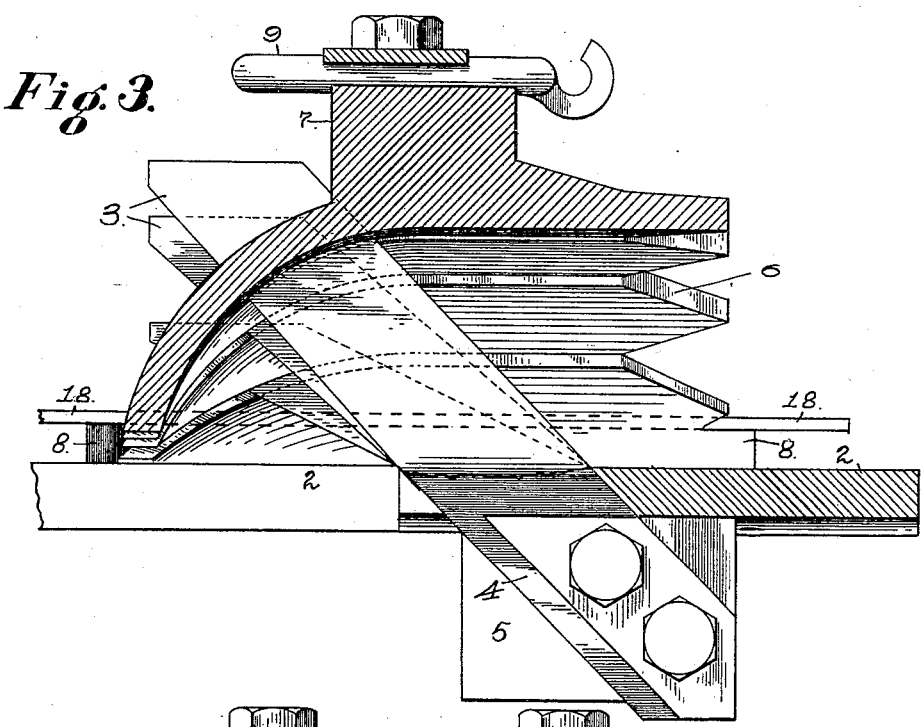
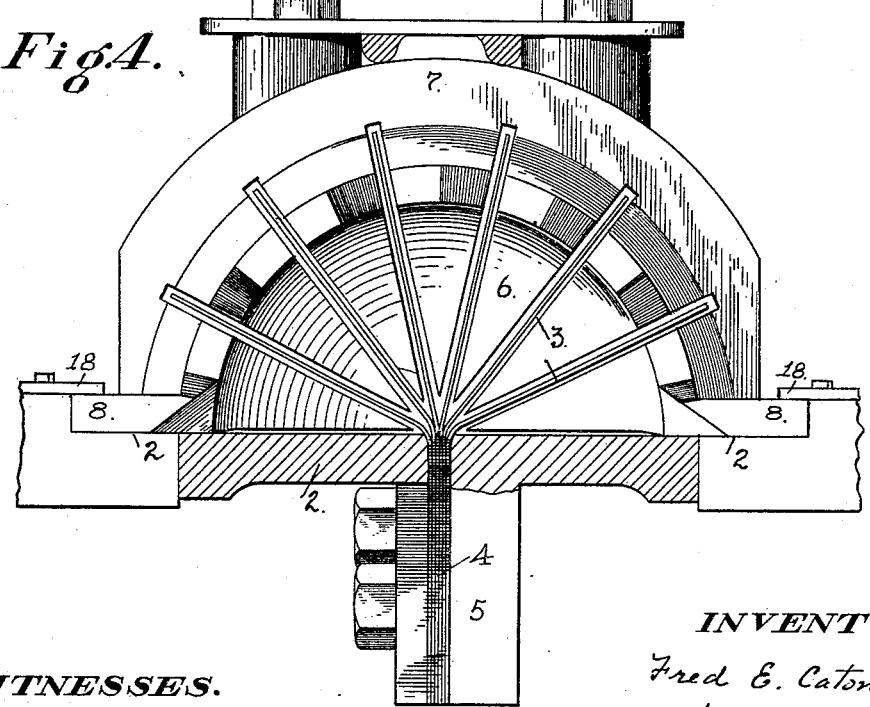
WITNESSES.
INVENTOR.
Fred E. Caton
by Wm F. Booth
his Attorney.

UNITED STATES PATENT OFFICE.

FRED E. CATON, OF SAN JOSE, CALIFORNIA, ASSIGNOR TO CATON'S FOUNDRY AND MACHINE COMPANY, OF SAN JOSE, CALIFORNIA, A CORPORATION OF CALIFORNIA.

FRUIT-SLICING MACHINE.

931,843.   Specification of Letters Patent.   Patented Aug. 24, 1909.

Application filed February 26, 1908. Serial No. 417,798.

*To all whom it may concern:*

Be it known that I, FRED E. CATON, a citizen of the United States, residing at San Jose, in the county of Santa Clara and State of California, have invented certain new and useful Improvements in Fruit-Slicing Machines, of which the following is a specification.

My invention relates to that class of fruit-slicing machines in which the fruit is partially embraced by a moving group of spaced fingers, and is forced by them against and past a fixed cluster of spaced knives, between which both fruit and fingers pass, whereby the fruit is sliced.

The object of my invention is to engage the fruit and present it to the knives without injury; to support it firmly while undergoing the action of the knives; and to slice it with clean cuts, into presentable segments.

To these ends my invention consists in the novel construction and arrangement of parts, which I shall now fully describe, by reference to the accompanying drawings in which—

Figure 1:
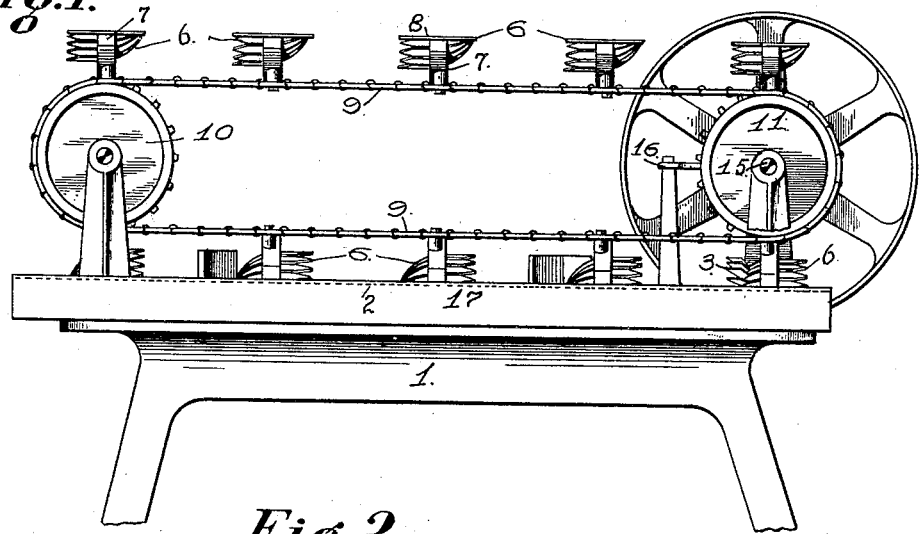
Figure 2:
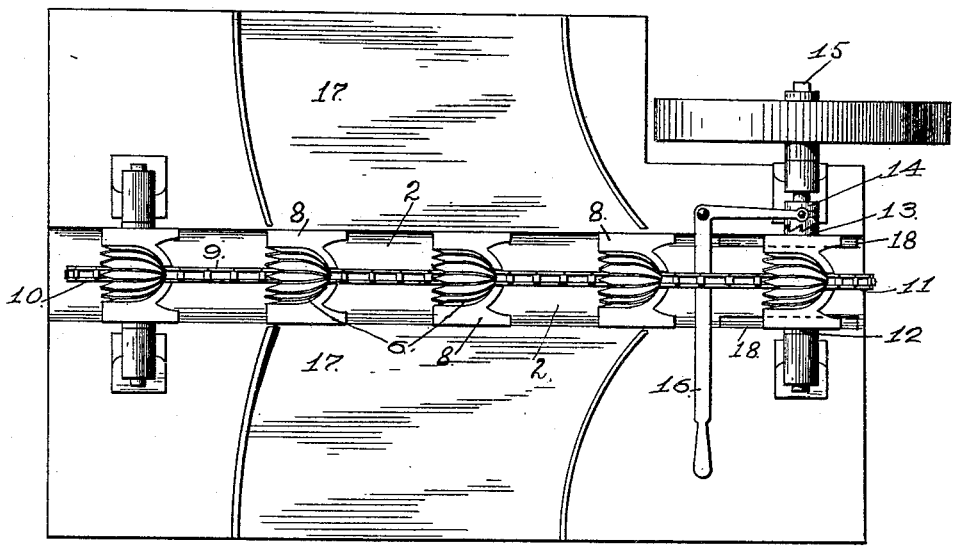

Figure 1 is a side elevation of my machine. Fig. 2 is a plan of the same. Fig. 3 is a sectional side elevation, showing one of the finger-groups passing the knife-cluster. Fig. 4 in an end view of the same.

1 is a stand, the top 2 of which is a straight bed-plate. At one end of this top or bed-plate 2 is the fixed cluster of spaced knives 3. The knives are disposed, as seen in Fig. 4, in radial planes, their divergence beginning approximately at the surface of the bed-plate, their shanks 4 passing through the bed plate 2 in a bunch and clamped below to a lug 5, as shown in Figs. 3 and 4, whereby the knives are firmly held. The knives slope or lean forwardly, as seen in Fig. 3, the whole knife-cluster being substantially the same as is common in this type of machine.

6 are the groups of spaced fingers. Each group is composed of a plurality of spaced fingers, concavo-convex in the direction of their length, and united by a semi-circular web 7, with base slides 8 on each side, the fingers being disposed to form a spherical segment socket, wide at the front and converging to the rear. These finger-groups 6 are secured, by their webs 7, to an endless traveling chain 9 which is mounted at one end on a sprocket 10 at the head of the machine, and at the other end on a sprocket 11 fixed on a sleeve 12 at the foot of the machine. The arrangement of the chain 9 is such that as each finger-group 6 is carried around the head sprocket 10, its base slides 8 will come down upon, be supported by, and will travel along the bed-plate 2, the fingers being then in their functionally operative position to receive the fruit, presenting an open-front spherical segment socket, closed below by the bed-plate on which it rests, travels and is supported.

In order to control the operation of the machine, by stopping and starting the travel of the finger-groups at will, the sprocket-sleeve 12 has a clutch end 13, Fig. 2, with which a clutch 14 feathered on the drive shaft 15, which carries the sleeve 12, is adapted to engage. The clutch 14 is thrown into and out of action by a lever 16 under the convenient control of the operator.

17 are side tables, the discharge ends of which lead to the bed-plate 2.

The operation of the machine is as follows:—Though it may be used to slice other fruits and vegetables, its particular use is to slice peaches. The peaches, previously peeled, pitted and halved, are deposited upon the tables 17. The machine being started, the operators, by hand, slip each half peach down from the tables onto the bed-plate 2, and deftly place them, one in front of each advancing finger-group, in such wise that it will fit neatly and firmly in the segmental socket formed by said group. By this finger-group the peach is pushed along the bed-plate to the knife-cluster 3. The spaced fingers are long enough to enter the knife spaces before the peach itself touches the knives, so that a firm and accurate engagement is had at once, to steady the parts and to present the peach to the knives with precision. Continued movement effects the passage of both the finger-group and the peach past the knife-cluster, during which the peach is well held and is sliced with accuracy into clean cut segments from circumference to circumference. The sliced fruit drops into a suitable receptacle, while the finger-group, after clearing the knife-cluster, rises and continues on its backward journey. By this arrangement of the finger-groups on an endless traveling chain, it is to be noted that the support of said groups while advancing to and during their work, is a level, straight bed-plate, which results, first, in causing the finger-groups to engage the peach with ease and accuracy and without injury to it, or pinching or bruising it, as must necessarily be the case where the finger-groups travel in a true circular path which causes them to come down on the fruit and makes it difficult to so place the fruit as to avoid being pinched as the fingers descend upon it; and, second, the approach of the finger-groups and their embraced fruit to the knives is, in my machine, in a straight firm path, so that the interengagement of the fingers and knives may take place throughout the whole extent, and the peach itself may be cut clean from edge to edge, leaving the slices free of any torn or ragged edges. The peach is, at all times, perfectly backed-up and supported by the finger-group-socket and the bed-plate, and the finger-groups travel on said plate with perfect firmness and guidance. This firmness of the finger-groups is insured, where most needed, by means of the fixed hold-down guide-strips 18 under which the base-slides 8 of the finger-groups pass. These strips 18 begin just before the finger-groups reach the knife-cluster, and terminate beyond said cluster, so that said groups are steadied at this essential period of their travel, and closely engage the knives. Though I have described the feeding of the fruit to the machine, by hand, I do not confine myself to this manual operation, as the feed may be otherwise carried out by any suitable feeding mechanism.

Having thus described my invention what I claim as new and desire to secure by Letters Patent is—

1. In a fruit slicing machine, the combination of a bed plate, a cluster of spaced knives secured thereto, an endless traveling chain having one of its courses moving toward the knife cluster groups, of fingers secured to said chain, each of the finger groups comprising a plurality of spaced fingers, concavo convex in the direction of their length and disposed to form a spherical segmental socket, and united intermediate their ends by a semi-circular web, each of said finger groups having portions at each side thereof with flat under surfaces to engage and slide upon the bed plate, and means for clamping the webs of the groups to the traveling chain.

2. In a fruit-slicing machine, the combination of a fixed cluster of spaced knives, a segmental group of spaced fingers, a straight bed-plate supporting the knife-cluster and finger-group, and an endless traveling chain to which the finger-group is secured, adapted to advance said group upon the bed-plate in a straight line to and through the knife-cluster.

3. In a fruit-slicing machine, the combination of a bed-plate, a cluster of spaced knives secured to and rising from said bed-plate, an endless traveling chain one of the courses of which moves toward the knife-cluster, and a segmental group of spaced fingers secured to said chain in position to be carried to and to rest upon said bed-plate while moving to and through the knife-cluster.

4. In a fruit-slicing machine, the combination of a bed-plate, a cluster of spaced knives secured to and rising from said bed-plate, an endless traveling chain mounted above the bed-plate with its lower course moving toward the knife-cluster, and a group of spaced fingers secured to said chain in position to be carried to and to rest upon said bed-plate while moving to and through the knife-cluster.

5. In a fruit-slicing machine, the combination of a bed-plate, a cluster of spaced knives secured to and rising from said bed-plate, an endless traveling chain having one of its courses moving toward said knife-cluster, and a segmental group of spaced fingers secured to said chain and having base slides adapted to move and be supported upon and by the bed-plate during the travel of said fingers toward and through the knife-cluster.

6. In a fruit-slicing machine, the combination of a bed-plate, a cluster of spaced knives secured thereto, an endless traveling chain having one of its courses moving toward the knife-cluster, a segmental group of spaced fingers secured to said chain and having base slides adapted to move and be supported upon and by the bed plate, and hold-down guide strips under which the base slides of the finger-group pass while the finger group approaches, passes through and leaves the knife-cluster.

In testimony whereof I have signed my name to this specification in the presence of two subscribing witnesses.

FRED E. CATON.

Witnesses:
Wm. F. Booth,
D. B. Richards.